Figure 1:
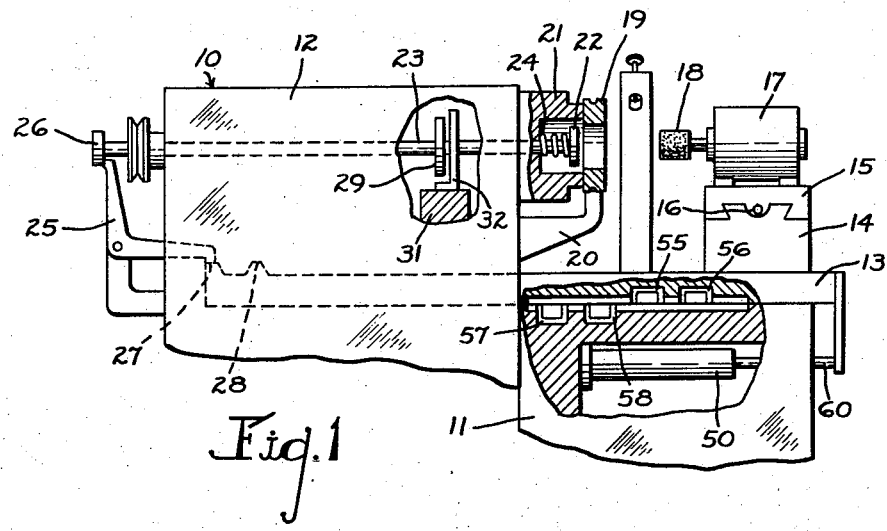

Sept. 15, 1959     C. S. YINGST     2,904,010
CONTROL FOR MACHINE TOOL

Filed Nov. 14, 1956     2 Sheets-Sheet 1

INVENTOR.
Cyrus S. Yingst
BY
Norman S. Blodgett
Attorney

Sept. 15, 1959　　　　　C. S. YINGST　　　　2,904,010
CONTROL FOR MACHINE TOOL

Filed Nov. 14, 1956　　　　　　　　　　　2 Sheets-Sheet 2

INVENTOR.
Cyrus S. Yingst
BY
Norman S. Blodgett
Attorney

United States Patent Office 2,904,010
Patented Sept. 15, 1959

2,904,010

CONTROL FOR MACHINE TOOL

Cyrus S. Yingst, West Boylston, Mass., assignor to The Heald Machine Company, Worcester, Mass., a corporation of Delaware Application November 14, 1956, Serial No. 622,156

7 Claims. (Cl. 121—45)

This invention relates to a control for machine tools and more particularly to apparatus for bringing about a change in relative movement between two parts of a machine.

In the past it has been the practice in machine tool design to use limit switches to terminate table movement and the like or, in the case of hydraulically-actuated machines, to use dogs to produce pilot valve reversal. These limit switches and dogs are subject to wear and breakage and their actuation requires a certain force of striking which, in the case of a delicate movement, such as gauge operation, is very appreciable and can render the control inaccurate. In the case of a less delicate movement, such as reversing table operation, the inertia of a heavy table may cause inaccuracy in the reversal position because of variations of table speed and because of the considerable inertia of the table. These and other deficiencies of the prior art construction have been obviated in a novel manner by the present invention.

It is therefore an outstanding object of the present invention to provide a control for a machine tool having cycle termination indicator with no moving parts and which is not subject to wear and breakage.

Another object of this invention is the provision of a control for use in the stopping or reversal of a portion of a machine tool in a manner which will compensate for inaccuracies due to speed and inertia effects.

A still further object of the invention is a control for a machine tool for indicating gage position without introducing inertia or force effects into the gage operation.

It is another object of the instant invention to provide a control for an internal grinder making use of a low-inertia, fast-response type of electromagnetic proximity switching to simplify and improve the service life of the gaging mechanism.

It is a further object of the invention to provide a control for a machine tool having a hydraulic table drive including means for dynamically compensating for table speed so as to maintain a fixed table stroke irrespective of table speed.

With these and other objects in view, as will be apparent to those skilled in the art, the invention resides in the combination of parts set forth in the specification and covered by the claims appended hereto.

Figure 2:
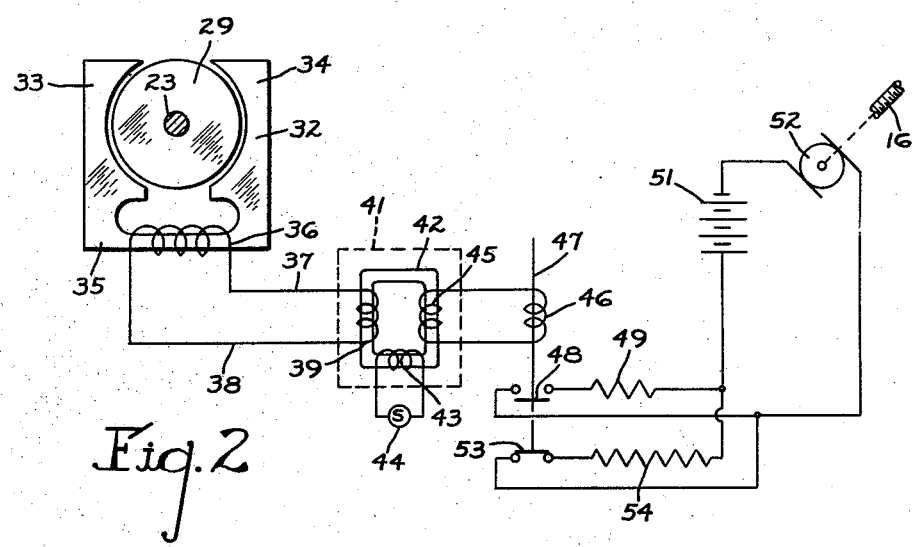
Figure 3:
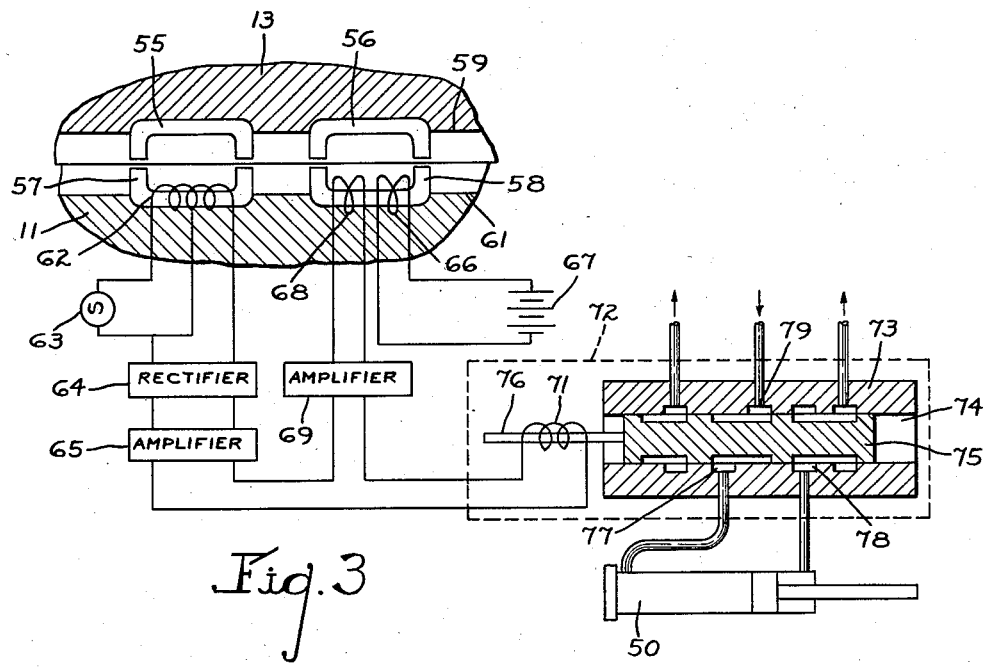
Figure 4:
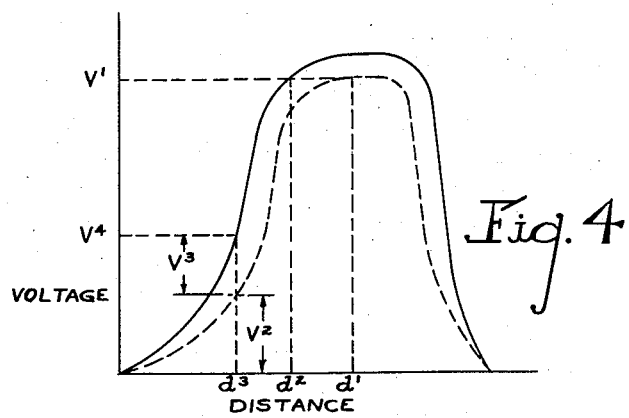

The character of the invention, however, may be best understood by reference to certain of its structural forms, as illustrated by the accompanying drawings in which:

Figure 1 is a somewhat schematic, elevational view of an internal grinding machine embodying the principles of the invention, Figure 2 is a schematic view of control apparatus used in connection with the machine of Figure 1, Figure 3 is a schematic view of further control apparatus used in connection with the machine of Figure 1, and Figure 4 is a graphical representation of voltage conditions present in the operation of the apparatus of Figure 3.

Referring to Figure 1, wherein are best shown the general features of the invention, the machine, indicated generally by the reference numeral 10 and shown as an internal grinding machine for the purposes of illustration, is provided with a base 11 on which are supported a workhead 12 and a slidable table 13. The table 13 supports cross-feed slide members 14 and 15; the cross-feed member 15 is movable by a screw 16 turned by a conventional feed mechanism, not shown. A motorized wheel head 17 is mounted on the member 15 and carries a tool 18 such as an abrading wheel, which during the grinding operation is coextensive with the workpiece and may reciprocate therein. An annular workpiece 19 having a bore to be finished is supported by a shoe 20 and may be rotated by a magnetic chuck 21 on the spindle of the workhead 12. The machine has incorporated therein a work gage to give a signal when a predetermined work size of the bore is reached. A satisfactory apparatus is illustrated by a work gage 22 of the plug type mounted on a rod 23 passing through the spindle of the workhead 12 and urged toward the work by a spring 24. A bell crank 25 engages a collar 26 on the rod 23 and holds the gage away from the work when the end of the crank is raised by a table cam 28 with the table in the loading position, as shown, or when raised by a table cam 27 to clear the wheel 18 in its extreme left position.

The gage rod 23 has an armature such as a thin metal disk 29 fastened thereto, as by welding, the disk being exactly perpendicular to the rod. A pedestal 31 is mounted on the workhead 12 and extending upwardly therefrom is a stationary sensing device 32 which is formed of a thin metal construction and resides at an exact right angle to the gage rod.

Referring to Figure 2, it is evident that the stationary sensing device 32 is formed as a generally U-shaped device having a bight 35 and two arcuate poles 33 and 34 intended to embrace the disk 29 when the two devices are coplanar. The disk and the sensing device are made of electromagnetic material, such as laminated sheets of silicon steel. Around the bight 35 is wound a coil 36 whose ends are attached by leads 37 and 38 to a coil 39 wound on one leg of a saturable reactor 41 having a closed core 42 of electromagnetic material. On another leg of the reactor is wound a coil 43 whose ends are connected to a source 44 of alternating current electricity. On a third leg of the core 42 is located an output coil 45 which is operatively connected to the coil 46 of a relay 47. The relay is provided with a normally-open contactor 48 arranged in series with a resistor 49; both resistor and contactor are connected with a source 51 of electrical power and a motor 52 in such a manner as to control the motor speed when the contactor is closed. The relay 47 is also provided with a normally-closed contactor 53 which is connected in series with a resistor 54; the contactor and resistor are connected to the source 51 and the motor 52 to control the motor speed when the contactor is closed. The resistor 49 is of greater value than the resistor 54, so that the motor 52 slows down when the coil 46 of the relay is energized. The motor 52 is connected to the feed mechanism regulating the screw 16, so that the feed rate of the wheel 18 radially of the workpiece 19 is controlled by the speed of the motor.

The operation of this apparatus will be readily understood in view of the above description. As the wheel 18 is withdrawn from the bore in the workpiece at each reciprocation of the table 13, the gage 22 attempts to enter it. When the bore diameter is less than the desired size, the gage merely strikes the workpiece but does not enter the bore. The disk 29, therefore, approaches but does not enter the space between the poles of the stationary sensing device. Eventually, however, the bore is enlarged by the abrading action of the wheel to the point wherein the gage enters and the rod continues to the right considerably further than usual. Now, the coil 43 has saturated the core of the reactor 41, thus inducing a small current in the coil 39 and the coil 36, thus setting up a field around the sensing device. A small current is induced in the coil 45, but not enough to actuate the relay 47. With the introduction of the disk 29 between the poles 33 and 34, the reactance associated with the coil 36 drops appreciably so that the current increases suddenly; this, in turn, causes the current in the coil 45 to increase and energize the coil 46 sufficiently to actuate the relay. The motor 52 has been driving the feed screw 16 at a high rate of speed and, now, the resistor 49 is replaced by the resistor 54, so that the motor and feed screw proceed at a much slower rate of speed. The slower rate of feed would correspond to a finishing grind. The same arrangement might be used to stop the feed altogether at the end of a finish grind.

Returning to Figure 1, it is evident that the table movement takes place under the influence of a cylinder 50 which is fastened in a recess in the base 11. A piston rod 60 extends from the cylinder and is connected to the right-hand end of the table. To control this table motion two armatures 55 and 56 are buried in the underside of the table, stationary sensing members 57 and 58 are buried in the upper surface of the bed 11. As is evident in Figure 3, the armatures are U-shaped and are spaced from each other with their legs aligned longitudinally of the machine. A shallow recess 59 is formed in the underside of the table, so that the ends of the armature legs extend freely. In the same way, a recess 61 is formed in the upper surface of the bed 11 and the ends of the U-shaped stationary sensing members 57 and 58 extend upwardly therefrom with the same spacing as described in connection with the armatures. A coil 62 is wound on the bight of the member 57 and this coil is connected in series with a source 63 of alternating current electricity and a rectifier 64; the output terminals of the rectifier are connected to the input terminals of an amplifier 65. An input coil 66 is wound on the bight of the stationary sensing member 58 and has connected across its ends a source 67 of direct current electricity. An output coil 68 is also wound on the bight of the member 58; its ends are connected to the input terminals of an amplifier 69. One of the output terminals of the amplifier 69 is connected to one of the output terminals of the amplifier 65; at the same time, the other output terminals of these two amplifiers are connected to opposite ends of a coil 71 forming the energizable element of an apparatus 72 including an electrohydraulic servo valve 73. The amplifiers are connected so that the sum of their voltages will appear on the ends of the coil 71. The apparatus 72 is of the well-known type arranged so as to respond linearly to voltage impressed on its coil. The servo valve has a cylindrical bore 74 in which is slidably mounted a plunger 75 having an actuating rod 76 which extends through the coil 71 and is moved linearly in response to changes in voltage thereacross. A port 77 is connected to one end of the cylinder 50, while a port 78 is connected to the other end of the cylinder. Hydraulic fluid enters the pilot valve through a port 79 and the position of the plunger 75 within the bore 74 not only determines which end of the cylinder will receive the pressure fluid, but also how much. The speed of movement of the table 13 is regulated in this manner.

The operation of this apparatus is similar to that described in connection with the device shown in Figure 2. Let it be assumed that it is desired to reverse the table motion at the end of a reciprocation of the wheel 18 within the workpiece 19; the armatures are positioned so that they overlie the stationary sensing members when the table is at the desired point of reversal. When the armature 55 is away from the sensing member 57, the alternating current source 63 causes a current to pass through the coil 62. The coil and the core associated therewith have a certain reactance, so that a definite, fixed A.C. voltage appears on the terminals of the rectifier 64 so that a fixed D.C. voltage appears on the input terminals of the amplifier 65. The amplified voltage appears across the coil 71, but is insufficient in value to produce any effect on the pilot valve. When the armature 56 is away from the sensing member 58, a constant D.C. current flows through the coil 66, but no voltage is induced in the coil 68 because no change of magnetic field takes place. Therefore, there is no output from the amplifier 69 that will add to the output voltage of the amplifier 65. As the table 13 approaches the reversal point, the armatures 55 and 56 approach positions overlying their respective stationary sensing members 57 and 58. It should be noted that the armature 55 and the member 57 are positioned considerably laterally of the armature 56 and its member 58, so that at no time does the armature 55 pass over the member 58 or the armature 56 pass over the member 57. Now, as the armature 55 comes to position over the member 57, the reactance of the latter is changed; as a matter of fact, the reactance drops, so that the current in the coil increases and the voltage appearing on the output terminals of the amplifier is increased more or less exponentially. If the armature passed completely over the member 57 and continued onward in the same direction, the voltage pattern appearing on the output terminals of the amplifier 65 would be similar to the broken-line curve in Figure 4, wherein voltage is the abscissa and distance of the table from the preselected reversal point is the ordinate. At the point $d^1$, which is the reversal point, the armature 55 will exactly overlie the member 57 and the voltage will have its maximum of $V^1$. This voltage $V^1$ will be sufficient to bring about complete reversal of the pilot valve, so that fluid flow to the cylinder 50 is reversed and so is the motion of the table. As a matter of fact, since the apparatus 72 reacts linearly to voltage appearing on the coil 71 exceeding a given base value, the pilot valve begins to reverse at the beginning of voltage increase and reaches the complete reversal at $V^1$. This manner of operation would be adequate if the table speed were always the same or if the table or the similar moving member had negligible inertia. However, changes in speed and large values of inertia make the point of actual reversal of the table change also; a certain period of time elapses between the time that the pilot valve reverses and the table speed is reduced to zero. This priod of time depends on the speed of the table. The armature 56 and its associated member 58 introduce a correcting factor to assure that the table stops at the same point regardless of its speed. As the armature 56 passes over the member 58, it changes the magnetic field associated with the coil 68, thus inducing a current in it and producing a voltage pulse on the output terminals of the amplifier 69. This voltage pulse adds to the voltage pulse from the amplifier 65 and the combined voltage appears on the coil 71 and positions the pilot valve accordingly. The magnitude of the voltage originating in the amplifier 69 is indicative of the speed of the table 13 relative to the base; it, in effect, differentiates distance with respect to time. At the point $d^3$, for instance, the voltage on the coil 71 will be a value $V^4$ made up of a voltage $V^2$ from the amplifier 65 and a voltage $V^3$ originating in the amplifier 69. The solid line curve in Figure 4 shows the curve of voltage appearing on the coil 71. The voltage thus placed on the coil causes the pilot valve to open considerably earlier relative to the reversal point than would be true under the influence only of the voltage originating in the amplifier 65; the amount that the pilot moves earlier is in proportion to the speed of the table. As a matter of fact, the voltage value $V^1$ at which complete reversal of the pilot valve is reached comes at the distance $d^2$ instead of $d^1$, so that the reversal is anticipated in proportion to the amount of kinetic energy in the table that would otherwise cause the table to overtravel the reversal point.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A control for a machine tool having a fixed element and a movable element, comprising a magnetic member fixed to the movable element, a stationary sensing device fastened to the fixed element, a first coil associated with the sensing device, a saturable reactor having an input coil, an output coil, and a saturating coil, the said first coil being connected to the said input coil, the magnetic member passing adjacent the sensing device at a predetermined point in the travel of the movable element relative to the fixed element so that the magnetic field associated with the coil is changed, the change in magnetic field causing a voltage pulsation, and a relay connected to the said output coil to bring about a change in the travel of the movable element relative to the fixed element in response to the voltage pulsation.

2. A control for a machine tool having a fixed element and a movable element with a hydraulic cylinder for producing travel between them comprising a magnetic member fixed to the movable element, a stationary sensing device fastened to the fixed element, a coil associated with the sensing device, the magnetic member passing adjacent the sensing device at a predetermined point in the travel of the movable element relative to the fixed element so that the magnetic field associated with the coil is changed, the change in magnetic field causing a voltage pulsation, and a linear servo valve connected to the coil to bring about a change in fluid flow to the cylinder to change the direction and rate of travel of the movable element relative to the fixed element in response to the voltage pulsation.

3. A control for a machine tool having a fixed element and a movable element, comprising a first and a second magnetic member fixed to the movable element, a first and a second stationary sensing device fastened to the fixed element, a first coil associated with the first sensing device, a second coil associated with the second sensing device, the magnetic members passing adjacent the sensing devices at a predetermined point in the travel of the movable element relative to the fixed element so that the magnetic fields associated with the coils are changed, the change in the magnetic field associated with the first coil causing a voltage pulsation proportional to the distance between the first magnetic member and the first stationary sensing device, the change in the magnetic field associated with the second coil causing a voltage pulsation proportional to the speed of movement of the second magnetic member relative to the second stationary sensing device, and means connected to the coils to bring about a change in the travel of the movable element relative to the fixed element in response to the sum of the voltage pulsations.

4. A machine tool having a fixed element, a movable element and a hydraulic cylinder for producing relative movement between the elements, comprising a first sensing device associated with one of the elements giving a voltage proportional to the relative positioning of the elements during the said movement, a second sensing device associated with one of the elements giving a voltage proportional to the relative speed of the elements during the said movement, and a linear servo valve connected to the devices to admit hydraulic fluid to the cylinder in an amount inversely proportional to the sum of the said voltages.

5. A control for a machine tool having a fixed element, a movable element and an actuator regulating machine operation, comprising a magnetic member fixed to the movable element, a stationary sensing device fastened to the fixed element, a first coil associated with the sensing device, a saturable reactor having an input coil, an output coil, and a saturating coil connected to an alternating curent power source, the said first coil being connected to the said input coil, the magnetic member passing adjacent the sensing device at a predetermined point in the travel of the movable element relative to the fixed element so that the magnetic field associated with the coil is changed, the change in magnetic field causing a voltage pulsation in the coil, and a relay connected to the said output coil to bring about a change in the actuator to vary the machine operation in response to the voltage pulsation.

6. A control for a machine tool having a fixed element and a movable element, comprising a first and a second magnetic member fixed to the movable element, a first and a second sensing device fastened to the fixed element, a first coil associated with the first sensing device and having an alternating magnetic field associated therewith, a second coil associated with the second sensing device and having a direct current magnetic field associated therewith, the magnetic members passing adjacent the sensing devices at a predetermined point in the travel of the movable element relative to the fixed element so that the magnetic fields associated with the coils are changed, the change in the magnetic field associated with the first coil causing a voltage pulsation therein proportional to the distance between the first magnetic member and the first stationary sensing device, means connected to the first coil for rectifying the alternating current component of the voltage pulsation, the change in the magnetic field associated with the second coil causing a voltage pulsation proportional to the speed of movement of the second magnetic member relative to the second stationary sensing device, and means connected to the coils to bring about a change in the travel of the movable element relative to the fixed element in response to the sum of the rectified voltage pulsation from the first coil and the voltage pulsation from the second coil.

7. A control for an internal grinding machine having a workhead, a gage movable relative thereto, and a wheelhead, comprising a disk formed of magnetic material fixed to the gage, a stationary sensing device fastened to the workhead, a coil associated with the sensing device, the disk passing between opposed poles of the sensing device at a predetermined point in the travel of the gage relative to the workhead so that the magnetic field associated with the coil is changed, the change in magnetic field causing a voltage pulsation, and an actuator connected to the wheelhead to regulate lateral feeding movement relative to the workhead and also connected to the coil to bring about a change in the said lateral movement in response to the voltage pulsation.

References Cited in the file of this patent

UNITED STATES PATENTS

| | | |
|---|---|---|
| 1,996,842 | Stevens | Apr. 9, 1935 |
| 2,004,361 | Arms | June 11, 1935 |
| 2,050,261 | Blood | Aug. 11, 1936 |
| 2,116,232 | Blood | May 3, 1938 |